(12) United States Patent
Groves et al.

(10) Patent No.: US 9,077,850 B1
(45) Date of Patent: Jul. 7, 2015

(54) RECORDING MULTI-PARTY VIDEO CALLS

(71) Applicant: Google Inc., Mountain View, CA (US)

(72) Inventors: Loren Groves, Sunnyvale, CA (US); Christopher P. D. Johnson, San Bruno, CA (US); Matthew J. Leske, Stockholm (SE)

(73) Assignee: Google Inc., Mountain View, CA (US)

( * ) Notice: Subject to any disclaimer, the term of this patent is extended or adjusted under 35 U.S.C. 154(b) by 208 days.

(21) Appl. No.: 13/742,037

(22) Filed: Jan. 15, 2013

(51) Int. Cl.
*H04N 7/14* (2006.01)
*H04N 7/15* (2006.01)

(52) U.S. Cl.
CPC ........................................ *H04N 7/15* (2013.01)

(58) Field of Classification Search
None
See application file for complete search history.

(56) References Cited

U.S. PATENT DOCUMENTS

| | | | |
|---|---|---|---|
| 7,808,521 B2* | 10/2010 | Lengeling et al. | 348/14.08 |
| 8,203,592 B2 | 6/2012 | Nelson et al. | |
| 2002/0031120 A1* | 3/2002 | Rakib | 370/386 |
| 2008/0120371 A1* | 5/2008 | Gopal | 709/204 |
| 2008/0266382 A1* | 10/2008 | Smith et al. | 348/14.08 |
| 2009/0086012 A1* | 4/2009 | Thapa | 348/14.08 |
| 2012/0051719 A1 | 3/2012 | Marvit | |
| 2012/0274730 A1 | 11/2012 | Shanmukhadas et al. | |
| 2014/0164501 A1* | 6/2014 | Herger et al. | 709/204 |

* cited by examiner

*Primary Examiner* — Maria El-Zoobi (57) ABSTRACT

A method, computer program product, and system is described. An indication of an intent of a first participant in a multi-party video-enabled call to record a portion of the call is received. A notification is provided to one or more other participants in the call of the indicated intent based upon, at least in part, receiving the indication. A perspective of the call associated with the first participant is recorded.

19 Claims, 4 Drawing Sheets

RECORDING MULTI-PARTY VIDEO CALLS

TECHNICAL FIELD

This disclosure relates to video-enabled electronic communication.

BACKGROUND

Individuals may find it useful and/or desirable to engage in video-enabled online communication sessions. Using various applications (e.g., video call applications), which may facilitate video, as well as audio, text, and/or other communication over electronic channels, individuals may simultaneously communicate with multiple other participants utilizing various computing devices such as laptops, camera-equipped cellular phones, desktop computers, tablets, and so on. In certain instances calls may be arranged, at least in part, using invitations, which may be sent to each desired participant in a planned call.

BRIEF SUMMARY OF THE DISCLOSURE

According to one aspect of the disclosure, a computer-implemented method includes receiving, by one or more computing devices, an indication of an intent of a first participant in a multi-party video-enabled call to record a portion of the call. The method further includes providing, by the one or more computing devices, a notification of the indicated intent to one or more other participants in the call, based upon, at least in part, receiving the indication. The method further includes recording, by the one or more computing devices, a perspective of the call associated with the first participant. The method further includes automatically sharing with one or more other participants, by the one or more computing devices, the recording of the perspective of the call associated with the first participant.

According to another aspect of the disclosure, a computer-implemented method includes receiving, by one or more computing devices, an indication of an intent of a first participant in a multi-party video-enabled call to record a portion of the call. The method further includes providing, by the one or more computing devices, a notification of the indicated intent to one or more other participants in the call, based upon, at least in part, receiving the indication. The method further includes recording, by the one or more computing devices, a perspective of the call associated with the first participant.

One or more of the following features may be included. The method may include providing, to the one or more other participants in the call, a notification that the call is being recorded. The notification may include a persistent indicator associated with a representation of the first participant. The method may include sharing, with the one or more other participants in the call, the recording of the perspective of the call associated with the first participant. The method may include associating an annotation with a portion of the recording. Associating the annotation may be based upon, at least in part, a viewing pattern associated with the recording. The recording may include one or more augmentations associated with the call. The recording may include an image file representing a view of the call. The recording may include a video file representing a portion of the call.

According to another aspect of the disclosure, a computing system includes one or more processor devices and one or more memory architecture coupled with the one or more processor devices. The one or more processor devices are configured to receive an indication of an intent of a first participant in a multi-party video-enabled call to record a portion of the call. The one or more processor devices are configured to provide a notification of the indicated intent to one or more other participants in the call, based upon, at least in part, receiving the indication. The one or more processor devices are configured to record a perspective of the call associated with the first participant.

One or more of the following features may be included. The one or more processor devices may be configured to provide, to the one or more other participants in the call, a notification that the call is being recorded. The notification may include a persistent indicator associated with a representation of the first participant. The one or more processor devices may be configured to share, with the one or more other participants in the call, the recording of the perspective of the call associated with the first participant. The one or more processor devices may be configured to associate an annotation with a portion of the recording. Associating the annotation may be based upon, at least in part, a viewing pattern associated with the recording. The recording may include one or more augmentations associated with the call. The recording may include an image file representing a view of the call. The recording may include a video file representing a portion of the call.

The details of one or more implementations are set forth in the accompanying drawings and the description below. Other features and advantages will become apparent from the description, the drawings, and the claims.

BRIEF DESCRIPTION OF THE SEVERAL VIEWS OF THE DRAWINGS

Like reference symbols in the various drawings indicate like elements.

DETAILED DESCRIPTION OF THE PREFERRED EMBODIMENTS

As part of online communication sessions, individuals may participate in multi-party video-enabled calls (herein also referred to as a "video call" or "call"). For example, using a video call application ("VCA") (and/or process) a participant in a multi-party video-enabled call may be able to speak with and view in real-time (or near real-time) video of various other participants in the call. A VCA may represent one or more of a variety of applications that may facilitate video and/or voice communication. It will be understood that in certain embodiments a VCA may include additional/alternative communication functionality such as email, text message and/or other functionality, including, for example, social networking functionality.

While participating in a video call, certain of individuals may wish to record a portion of the call, including, potentially audio, image, and/or video data (e.g., audio capture, screenshots, video capture, and so on) of the call. In certain embodiments, a video call recording and sharing ("VCRS") process may address this and other issues. For example, some embodiments of a VCRS process may facilitate a participant in a video-enabled call designating a call (or a portion thereof) for recording. A VCRS process may further facilitate recording of the participant's perspective of the call (e.g., the view a particular participant sees while participating in the call) and/or various other perspectives. For example, using a VCRS process a participant in a video call may record a screenshot of the call or a video of a portion of the calls in which she participates. Such recording may, for example, be initiated (and/or stopped) based upon an input from such a participant.

In an embodiment, other participants may be notified when a particular participant designates a call for recording and/or when a call is actually being recorded. For example, a persistent indicator may be shown to various participants next to an icon (and/or other display) representing the participant who has initiated a recording, which may notify the other participants that the call may be and/or is currently being recorded.

In an embodiment, the recording of a particular participant's perspective may be shared with other participants in and/or invitees to the call. In certain embodiments, such sharing may be automatic (e.g., may occur as a system default). For example, in certain embodiments, the recording may be automatically shared with all invitees to the call, including participants that have joined the call before and/or after the recording begins and/or ends. In certain embodiments, the recording may be additionally/alternatively shared with invitees who did not join the call at all. In certain embodiments one or more recordings associated with a particular call may be automatically stored in a repository associated with the call, which may be accessible to each invitee associated with the call. In certain embodiments, a recording may additionally/alternatively be shared with individuals who are not invitees associated with the call (e.g., at the discretion of the participant recording the call).

In an embodiment, a participant who initiates a recording (and/or other participants in the call or viewers of the recording) may associate with a recording various annotations, such as associated files, comments (e.g., from a comment feed associated with the call and/or the recording), tags and other information. In certain embodiments, such association of an annotation may relate to a particular time or time period of the recording, which time or time period may be determined in various ways. For example, an annotation may be associated with a particular time period of a video recording based upon contextual (and/or other) analysis, such as analysis of various patterns associated with the viewing of the video (i.e., "viewing patterns"). For example, a tag (and/or comment, file, and so on) may be associated with a portion of a recording based upon that portion having been viewed (or re-viewed) a certain number of times and/or by a certain number of participants and/or non-participant individuals. Similarly a tag (and/or other annotation) may be associated with a portion of a recording based upon that portion having been viewed more often than other portions of the recording (e.g., if viewers of a video recording generally watch only a that portion of the video before closing the video file).

In an embodiment, the recording may include various augmentations (e.g., visual and/or audio effects) associated with the call in addition/as an alternative to un-augmented audio, images and/or video and so on. For example, in certain embodiments participants may activate visual effects that alter their appearance to others on the call (e.g., that place virtual masks on the video representation of their faces). In certain embodiments, such visual (and/or other) effects may be included in the recording.

As will also be discussed below, a VCRS process may be implemented in a variety of ways. For example, a VCRS process may be implemented as part of (or in conjunction with) a VCA and/or other application (or process). In certain embodiments, a VCRS process may be implemented as part of (or in conjunction with) a social networking application, and/or various other communication applications (e.g., an application facilitating exchanges of email, texting, and so on). In certain embodiments, a VCRS process may be implemented on a mobile computing device such as a cell phone or tablet.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer usable medium may be a computer readable signal medium or a computer readable storage medium. A computer-usable, or computer-readable, storage medium (including a storage device associated with a computing device or client electronic device) may be, for example, but not limited to, an electronic, magnetic, optical, electromagnetic, infrared, or semiconductor system, apparatus, or device, or any suitable combination of the foregoing. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device. In the context of this document, a computer-usable, or computer-readable, storage medium may be any tangible medium that can contain, or store a program for use by or in connection with the instruction execution system, apparatus, or device.

A computer readable signal medium may include a propagated data signal with computer readable program coded embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Figure 1:
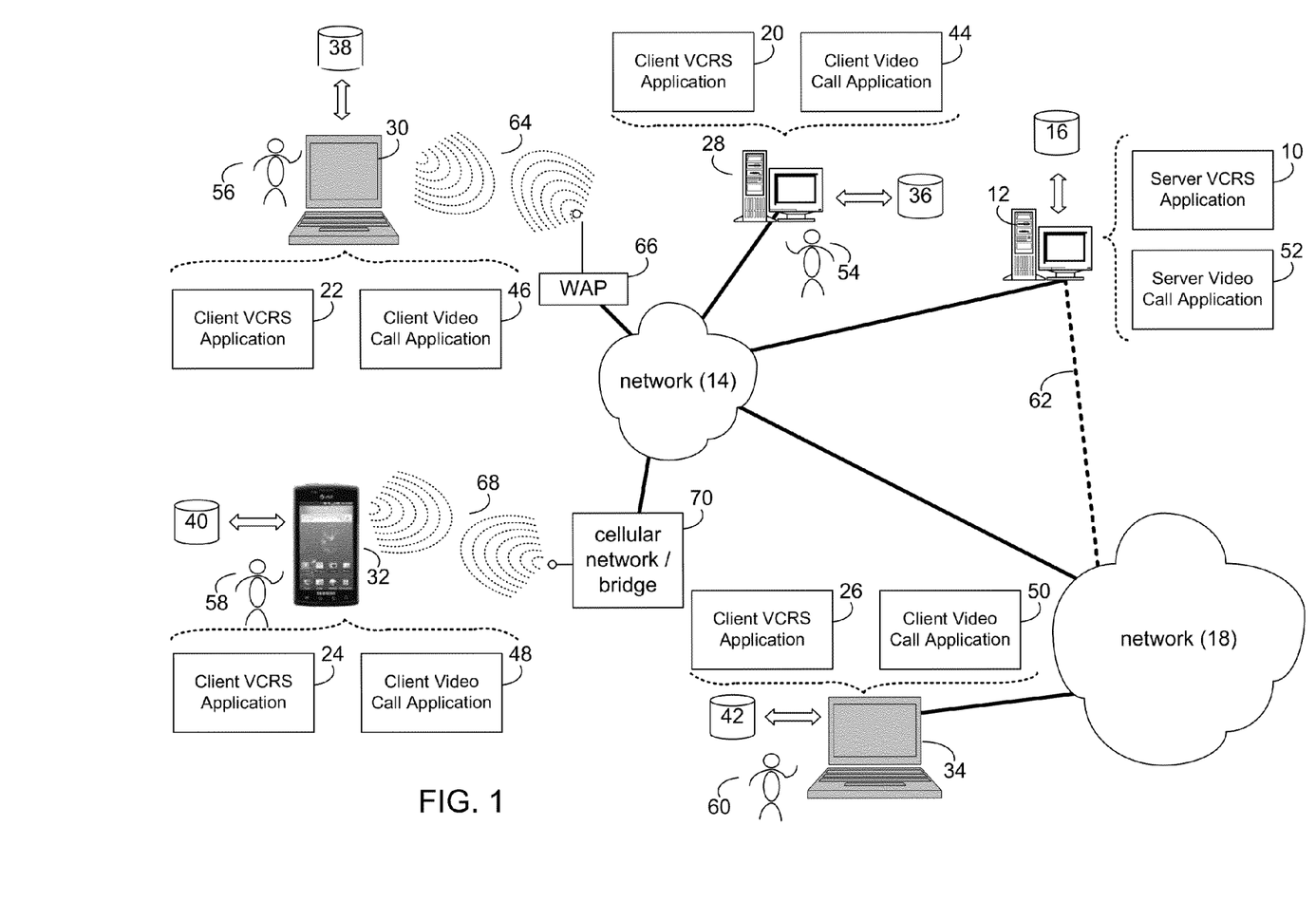
FIG. 1 is a diagrammatic view of a video call recording and sharing process coupled to a distributed computing network.

Referring now to FIG. 1, a VCRS process may be coupled to a computer or computer network. For example, server VCRS process 10 may reside on and may be executed by server computer 12, which may be connected to network 14 (e.g., the Internet or a local area network). Examples of server computer 12 may include, but are not limited to: a personal computer, a server computer, a series of server computers, a mini computer, and/or a mainframe computer. Server computer 12 may be a web server (or a series of servers) running a network operating system, examples of which may include but are not limited to: Microsoft® Windows Server® Novell® Netware®; or Red Hat® Linux®, for example. (Microsoft and Windows are registered trademarks of Microsoft Corporation in the United States, other countries or both; Novell and NetWare are registered trademarks of Novell Corporation in the United States, other countries or both; Red Hat is a registered trademark of Red Hat Corporation in the United States, other countries or both; and Linux is a registered trademark of Linus Torvalds in the United States, other countries or both.)

The instruction sets and subroutines of server VCRS process 10, which may be stored on storage device 16 coupled to server computer 12, may be executed by one or more processors (not shown) and one or more memory architectures (not shown) incorporated into server computer 12. Storage device 16 may include but is not limited to: a hard disk drive; a tape drive; an optical drive; a RAID array; a random access memory (RAM); and a read-only memory (ROM).

Server computer 12 may execute a web server application, examples of which may include but are not limited to: Microsoft® IIS, Novell® Web Server™, or Apache® Web Server, that allows for access to server computer 12 (via network 14) using one or more protocols, examples of which may include but are not limited to HTTP (i.e., HyperText Transfer Protocol), SIP (i.e., session initiation protocol), and the Lotus® Sametime® VP protocol. (Webserver is a trademark of Novell Corporation in the United States, other countries, or both; Apache is a registered trademark of Apache Software Foundation in the United States, other countries, or both; Lotus and Sametime are registered trademarks of International Business Machine Corp. in the United States, other countries, or both.) Network 14 may be connected to one or more secondary networks (e.g., network 18), examples of which may include but are not limited to: a local area network; a wide area network; or an intranet, for example.

Client VCRS processes 20, 22, 24, 26 may reside on and may be executed by client electronic devices 28, 30, 32, and/or 34 (respectively), examples of which may include but are not limited to personal computer 28, laptop computer 30, a data-enabled mobile telephone 32, notebook computer 34, personal digital assistant (not shown), smart phone (not shown) and a dedicated network device (not shown), for example. Client electronic devices 28, 30, 32, 34 may each be coupled to network 14 and/or network 18 and may each execute an operating system, examples of which may include but are not limited to Microsoft® Windows®, Microsoft Windows CE®, Red Hat® Linux®, or a custom operating system.

The instruction sets and subroutines of client VCRS processes 20, 22, 24, 26, which may be stored on storage devices 36, 38, 40, 42 (respectively) coupled to client electronic devices 28, 30, 32, 34 (respectively), may be executed by one or more processors (not shown) and one or more memory architectures (not shown) incorporated into client electronic devices 28, 30, 32, 34 (respectively). Storage devices 36, 38, 40, 42 may include but are not limited to: hard disk drives; tape drives; optical drives; RAID arrays; random access memories (RAM); read-only memories (ROM); compact flash (CF) storage devices; secure digital (SD) storage devices; and memory stick storage devices.

In an embodiment, the VCRS process may be a server-side process (e.g., which may be implemented via server VCRS process 10), in which all of the functionality of the VCRS process may be executed on a server computer (e.g., server computer 12). In an embodiment, the VCRS process may be a client-side process (e.g., which may be implemented via one or more of client VCRS processes 20, 22, 24, 26), in which all of the functionality of the VCRS process may be executed on a client computing device (e.g., one or more of client electronic devices 28, 30, 32, 34). In an embodiment, the VCRS process may be a hybrid server-client process (e.g., which may be implemented by server VCRS process 10 and one or more of client VCRS processes 20, 22, 24, 26), in which at least a portion of the functionality of the VCRS process may be implemented via server computer 12 and at least a portion of the functionality of the VCRS process may be implemented via one or more client computing devices (e.g., one or more of client electronic devices 28, 30, 32, 34).

A video call application ("VCA") (and/or process) may operate on a client device (e.g., client VCA 44, operating on client electronic device 28; client VCA 46, operating on client electronic device 30; client VCA 48, operating on client electronic device 32; or client VCA 50, operating on client electronic device 34). A client VCRS process (e.g., client VCRS process 20) or a server VCRS process (e.g., server VCRS process 10) may be in communication and/or interact with a client VCA (e.g., client VCA 44) or may be part of a client VCA. Further, in an embodiment a client VCRS process may include a module and/or component of a client VCA. In such an embodiment at least a portion of the functionality of the VCRS process may be provided by the client VCA.

A VCA may additionally or alternatively operate on a server device (e.g., server VCA 52, operating on server computer 12 or another server VCA (not shown), operating on another server computer (not shown)). A server VCRS process (e.g., server VCRS process 10) or a client VCRS process (e.g., client VCRS process 20) may be in communication and/or interact with a server VCA (e.g., server VCA 52) or may be a part of a server VCA. Further, in an embodiment a server VCRS process may include a module and/or a component of a server VCA (or vice versa). In such an embodiment at least a portion of the functionality of the VCRS process may be provided by the server VCA (or vice versa).

In addition to functionality related to video-enabled electronic communication, in certain embodiments, a VCA and/or a VCRS may provide (and/or interact with other applications or processes providing) social networking application functionality. For example, a VCA and/or VCRS may facilitate posting, sharing, commenting on, editing, and so on of various content (including, for example, content captured through a VCRS process) through a social networking application (or process). In certain embodiments, VCA and/or VCRS functionality may additionally/alternatively be included within a social networking application (not shown). Additionally/alternatively one or more of a client (and/or server) VCA and/or a client (and/or server) VCRS process may interface and/or interact with a social networking application (not shown), which may reside on and/or be executed by, at least in part, server computer 12 and/or another computing device.

Users 54, 56, 58, 60 may access a VCRS process in various ways. For example, these users may access server VCRS process 10 directly through the device on which a client process (e.g., client VCRS processes 20, 22, 24, 26) is executed, namely client electronic devices 28, 30, 32, 34. Users 54, 56, 58, 60 may access server VCRS process 10 directly through network 14 and/or through secondary network 18. Further, server computer 12 (i.e., the computer that executes server VCRS process 10) may be connected to network 14 through secondary network 18, as illustrated with phantom link line 62. Users 54, 56, 58, 60 may also access a client or server VCA in similar ways.

The various client electronic devices may be directly or indirectly coupled to network 14 (or network 18). For example, personal computer 28 is shown directly coupled to network 14 via a hardwired network connection. Further, notebook computer 34 is shown directly coupled to secondary network 18 via a hardwired network connection. Laptop computer 30 is shown wirelessly coupled to network 14 via wireless communication channel 64 established between laptop computer 30 and wireless access point ("WAP") 66, which is shown directly coupled to network 14. WAP 66 may be, for example, an IEEE 802.11a, 802.11b, 802.11g, 802.11n, Wi-Fi, and/or Bluetooth device that is capable of establishing wireless communication channel 64 between laptop computer 30 and WAP 66. Data-enabled mobile telephone 32 is shown wirelessly coupled to network 14 via wireless communication channel 68 established between data-enabled mobile telephone 32 and cellular network/bridge 70, which is shown directly coupled to network 14.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

For the following discussion, client VCRS process 20 will be described for illustrative purposes. It will be understood that client VCRS process 20 may, for example, interact and/or communicate with a server VCRS process such as server VCRS process 10 and/or may be executed within one or more applications that allow for communication with other server and/or client VCRS processes. VCRS process 20 may be utilized as part of or in conjunction with a variety of server and/or client VCAs, such as client VCA 44 or server VCA 52. In certain embodiments VCRS process 20 may be utilized as part of or in conjunction with a variety of other consumption applications and/or communication applications (not shown), facilitating consumption of content and/or communication among individuals and/or groups. This is not intended to be a limitation of this disclosure, as other configurations are possible. For example, some implementations may include one or more of client VCRS processes 22, 24, 26 or server VCRS process 10 in place of or in addition to client VCRS process 24. Additionally/alternatively, VCRS process 24 may include stand-alone client processes and/or stand-alone server processes, VCRS process may be utilized as part of or in conjunction with client VCA 44, 46, 50 or another server VCA or other applications (not shown), and so on.

Figure 2:
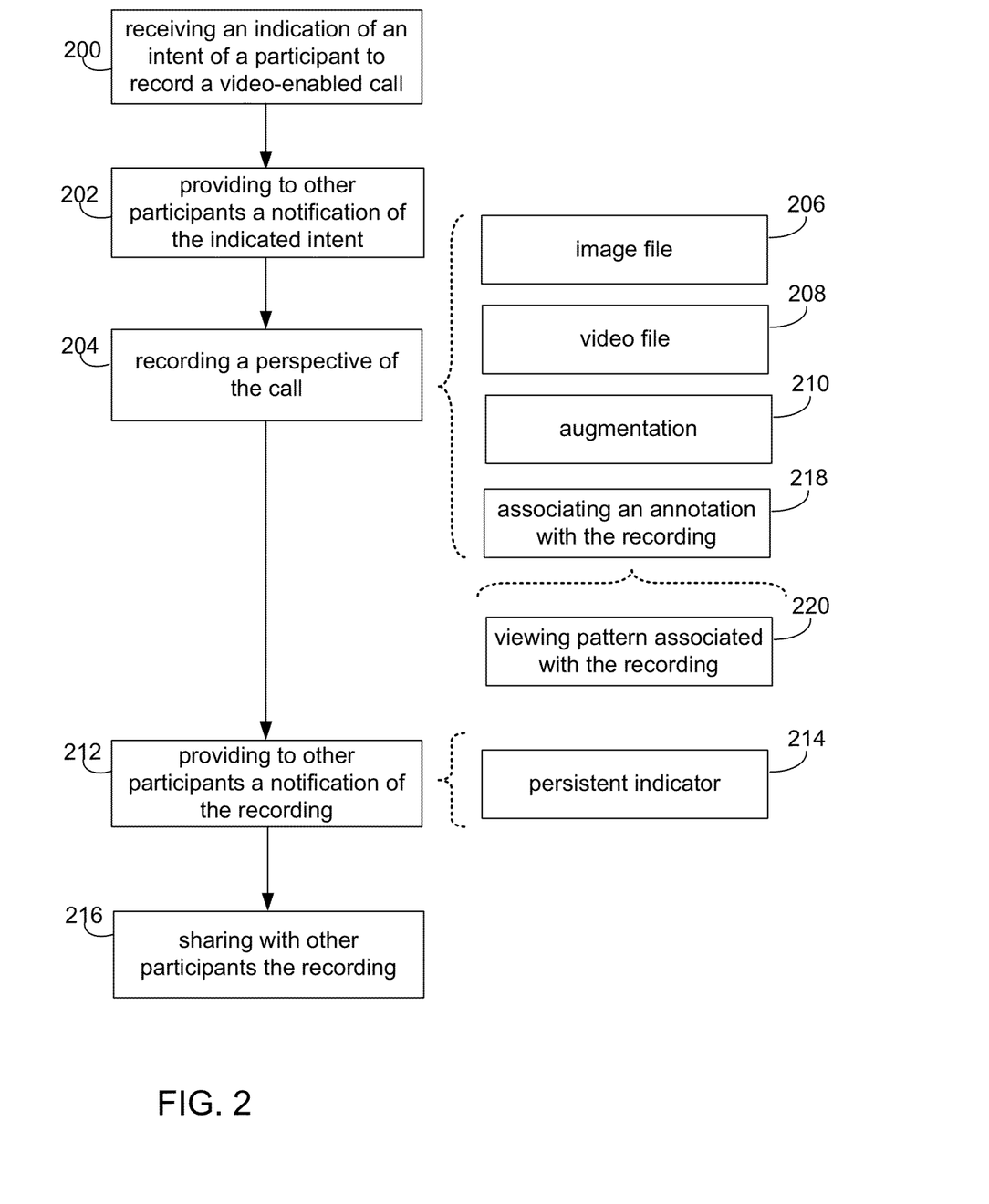
FIG. 2 is a flowchart of a process executed by the video call recording and sharing process of FIG. 1.

Referring now also to FIG. 2, there is shown a diagrammatic view of an example process that may be implemented by a VCRS process, e.g., client VCRS process 20. VCRS process 20 may receive 200 an indication of an intent of a participant in a multi-party video-enabled call (i.e., a "video call" or "call") to record a portion of the call. For example, while participating in a video-enabled electronic call a participant may desire to memorialize (i.e., record) a portion of the call, such as a screenshot, an audio segment, a video segment, and so on. Accordingly, such participant may indicate (e.g., by selecting a particular icon or action button) that she intends to record one or more aspects of the call.

VCRS process 20 may provide 202 a notification of the indicated intent to one or more other participants in the video call. For example, based upon, at least in part, receiving 200 the indication of the participant's intent to record the call, VCRS process 20 may provide 202 a notification to other participants that the call has been designated for recording. In certain embodiments, such notification may be expressly associated with the participant from whom the indication of intent to record has been received 200. For example, VCRS process 20 may receive 200 an indication from participant Jane that she intends to record a portion of an ongoing video call and may accordingly provide 202 a notification to other participants in the call that Jane has designated the call for recording. In certain embodiments, such notification may be more general. For example, VCRS process 20 may receive 200 an indication from participant Jane that she intends to record a portion of an ongoing video call and may accordingly provide 202 a notification to other participants in the call that the call has been generally designated for recording.

VCRS process 20 may record 204 a perspective of the video call. In certain embodiments, VCRS process 20 may record 204 a perspective of the video call only after a notification has been provided 202 to various participants that the call has been designated for recording. In this way, for example, various individuals may be made aware that the call in which they are participating may be recorded, in advance of the start of the recording.

VCRS process 20 may record 204 various perspectives of a video call. VCRS process 20 may record 204 an image file 206, a video file 208, and/or various other types of files. In certain embodiments VCRS process 20 may record 204 a perspective associated with the user who has initiated the recording. For example, if participant Jane has requested (e.g., via selecting a particular icon or action button) that a portion of a call be recorded, VCRS process 20 may record the screen view that Jane sees (e.g., as one or more pictures/image files and/or one or more video files), the audio that Jane hears, and so on. In certain embodiments, VCRS process 20 may record 204 a different perspective from the perspective of the individual who has requested the recording. For example, VCRS process 20 may record 204 all possible views of the video call, all audio streams associated with the video call, and so on. For example, VCRS process 20 may record each video stream associated with a call (including, for example, a video stream displaying a view of the participant who initiated the recording), each audio stream associated with a call (including, for example, an audio stream representing the speech of the participant who initiated the recording), and so on. In certain embodiments, VCRS process 20 may a record 204 a view associated with a participant other than the participant requesting the recording, audio associated with such other participant, and so on.

In certain embodiments, a recording facilitated by VCRS process 20 may include an augmentation 210 associated with the video call. An augmentation may be a visual effect, audio effect, and/or other effect that alters the visual, aural, and/or other perception of the call of one or more participants in the call. For example, in certain embodiments participants in a video call may activate augmenting functionality that alters their appearance in the video call (e.g., by placing a mask, hat, or other simulated article on or around their image), that alters the audio of the video call (e.g., by distorting or otherwise altering the transmitted/recorded speech of a participant and/or other audio), and so on. In certain embodiments, such augmentations (and/or others) may be captured as part of VCRS process 20 recording 204 a perspective of the call. In this way, for example, later viewers of a portion of the call (e.g., of a video segment or screen capture) may also view an augmentation that had been included in the original call with respect to that portion of the call.

In certain embodiments VCRS process 20 may provide 212 to other participants in the call a notification that the call is being recorded. For example, if participant Jane has initiated a recording of a portion of a video call, VCRS process 20 may provide 212 a notification of this fact to one or more other participants in the call. In this way, for example, participants in a call may be made aware of whether the call is currently being (and/or is about to be) recorded. VCRS process 20 may provide 212 a notification to various individuals, including current participants in a call, invitees who have not joined (or have already left) the call, and/or other individuals.

In certain embodiments, a provided 212 (and/or other) notification may be a persistent indicator 214 associated with the participant who is recording the call. For example, if participant Jane has initiated recording of a portion of an ongoing video call, VCRS process 20 may provide 212 an indicator 214 nearby (and/or as part of) an icon, image or other representation of Jane on the screen of other participants in the call. In this way, for example, the other participants may be notified not only that the call is currently being recorded, but also that at least one current recording was initiated by Jane.

It will be understood that VCRS process 20 may facilitate recording 204 multiple different perspectives of a call simultaneously and/or at various different times. For example, if Jane, Greg and Natalie are participating in a video call, VCRS process 20 may receive 200 an indication of an intent of both Greg and Natalie to record the call, may accordingly provide 202 a notification of this intent to Jane, Greg, and/or Natalie, may record 204 both Greg's and Natalie's (and/or various other) perspectives on the call (including, for example, various augmentations 210 associated with such perspectives), may provide 212 to Jane, Greg and/or Natalie a notification that Greg and Natalie have initiated recording, and so on.

It will be further understood that in certain embodiments receiving 200 an indication of a participant's intent to record a video-enabled call may include receiving an indication that the participant desires to initiate recording immediately. For example, a participant may both provide an indication of intent to record and request a start to the recording in a single action (e.g., clicking a "Record Now" action button or icon). As such, in certain embodiments, providing 202 a notification of a participant's intent to record a call and providing 212 a notification that a recording is ongoing may be included in a single notification. Similarly, in certain embodiments, VCRS process 20 may receive 200 an indication of a participant's intent to record a video-enabled call based on a characteristic of the call (e.g., that the call, by default, may be recorded by any participant).

In certain embodiments VCRS process 20 may share 216 a recording (or a portion thereof) with other participants in the call and/or other invitees to the call. For example, in certain embodiments, VCRS process 20 may, by default (and/or based on various settings or preferences) automatically share 216 any recording associated with a call with all invitees to the call. For example, VCRS process 20 may make such recording available in a shared folder to which all invitees to the call are permitted access. In certain embodiments, based for example upon receiving various input from various participants, VCRS process 20 may share 216 a recording with a different set of individuals (e.g., a subset of invitees to a call, a set of individuals not invited to the call, and so on). In certain embodiments, for example, VCRS process 20 may share 216 a recording over a social network with various social network connections of one or more participants in the recorded call.

In certain embodiments VCRS process 20 may associate 218 an annotation with the recording of the call. For example, it may be useful to associate one or more tags, comments, files (e.g., other video, audio or image files), and/or other information (i.e., various "annotations") with a portion of a recording of a video call. In certain embodiments, VCRS process 20 may associated 218 an annotation with a recording based upon various user input. For example, based upon input from one or more participants in a video call, VCRS process 20 may associate 218 a tag or comment (e.g., a comment such as "Nice hat, Jane!" or a tag such as "Celebrity Sighting!") with a particular portion of a recorded 204 perspective of the call. In certain embodiments, VCRS process 20 may similarly associate a file (e.g., a related video, image, and so on) with a portion of such a recording. For example, based upon the input of one or more participants in the call (and/or viewers of the recording and so on), VCRS process 20 may associate a related video (e.g., a different video of the same participants engaging in a different video call) with a portion of the recording.

In certain embodiments, associating 218 an annotation with a recording may be based upon, at least in part, a viewing pattern 220 associated with the recording. A viewing pattern may be one or more of various patterns associated with the viewing of a recording, such as a video or screen capture, by various individuals. For example, for a particular video recording, VCRS process 20 may determine that the majority of individuals who viewed the video only watched a particular 2-minute segment toward the end of the video. Based, for example, on such a viewing pattern, VCRS process 20 may associate 218 an annotation (e.g., "Hot Conversation," or "Most Popular Segment") with the particular 2-minute segment. Similarly, for example, VCRS process 20 may determine that a particular segment of a video (and/or other recording) has been viewed (and/or re-viewed) more than a threshold number of times, by a certain number of participants and/or non-participants in the call, and so on, and may associate 218 an annotation with the video accordingly. (It will be understood that this discussion of viewing patterns 220 is provided for the purpose of example, and that various other viewing patterns 220 and related associating 218 of an annotation with portions of recordings are possible.)

Figure 3:
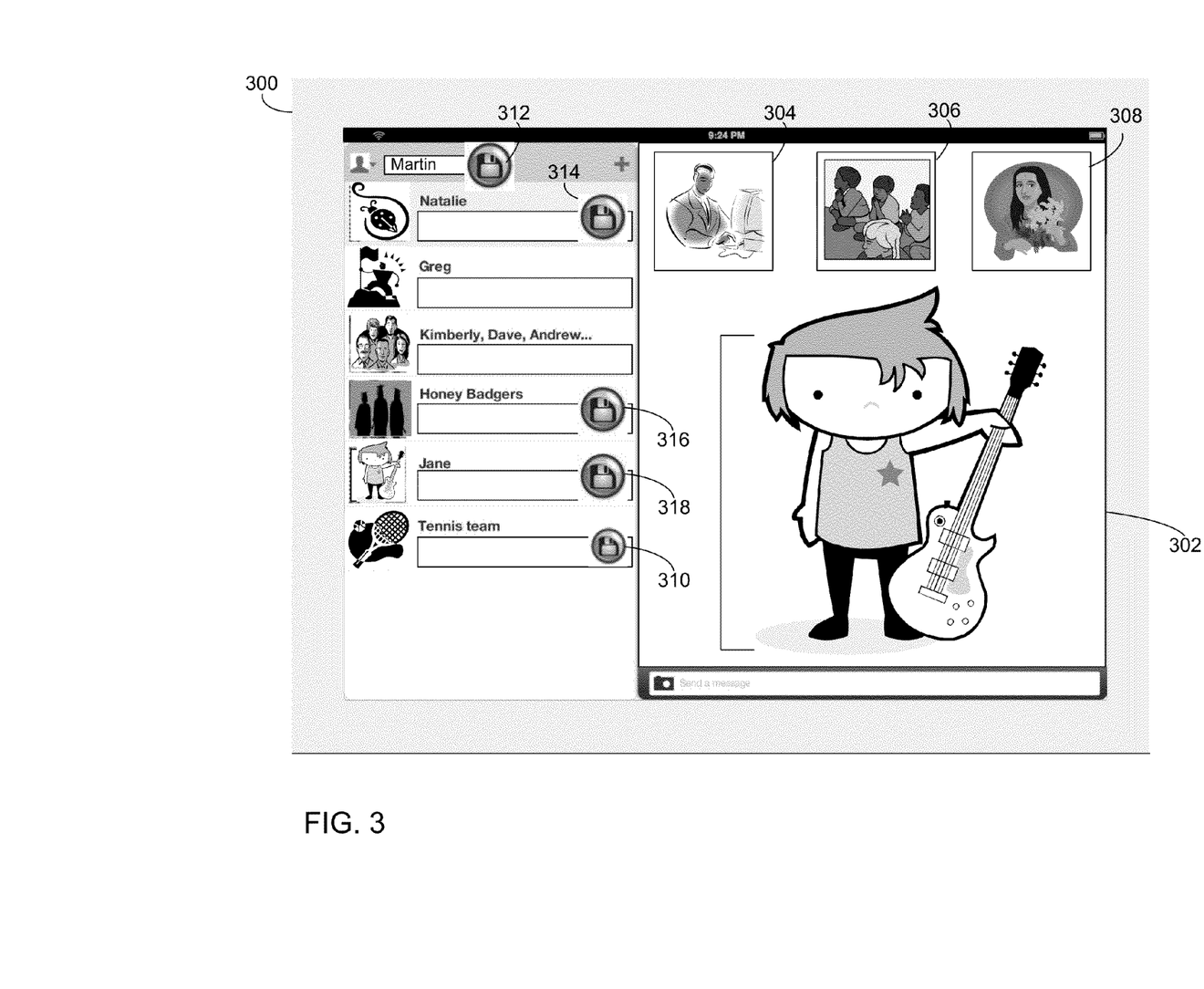
FIG. 3 is a diagrammatic view of an implementation of the video call recording and sharing process of FIG. 1.

Referring now also to FIG. 3, user Martin may be participating in a video call using a device providing user interface 300. As such, a perspective on the call may be displayed to Martin via user interface 300 including, for example, main video view 302, secondary views 304, 306 and 308, a list of current participants (and/or invitees—not shown), and so on. Main view 302 may, for example, represent a video of user Jane showing off her new guitar because Jane is the current active speaker in the call. Secondary views 304, 306 and 308 may, for example, show thumbnail representations of video (e.g., screenshots, lower-resolution video, and so on) of certain other participants in the call, such as Martin, the Honey Badgers, and Natalie, respectively.

Martin may desire to record a view of Jane's new guitar and may, accordingly, indicate this desire to VCRS process 20 (e.g., by selecting a particular icon or button). Based upon receiving 200 this indication, VCRS process 20 may provide 202 a notification (not shown) to various other participants in the call that the call has been designated for recording by Martin. Similarly, VCRS process 20 may provide 202 to Martin (and/or various other participants) a notification that the call has been designated for recording by another participant. For example, icon 310 may indicate to Martin (and/or other participants in the call) that Tennis Team has indicated an intent to record the call (but, because icon 310 is small and "grayed," that Tennis Team may not currently be recording the call).

In certain embodiments, after (or as part of) indicating an intent to record the call, Martin may initiate recording (e.g., by clicking a particular icon or button), prompting VCRS process 20 to record 204 a particular perspective of the call (e.g., Martin's view of main video view 302 and/or secondary views 304, 306 and 308). While the call is being recorded for Martin (and/or other participants), VCRS process 20 may provide 212 an indication that the recording is ongoing to various participants in the call. For example, icon 312 may indicate that VCRS process 20 is currently recording a perspective of the call for Martin. In certain embodiments, icon 312 may be visible near a representation of Martin (e.g., Martin's name, icon, or avatar, and so on) for other participants in the call as well as for Martin. In certain embodiments, VCRS process 20 may similarly provide 212 other notifications that other recording is ongoing. For example, ions 312, 314 and 316 may indicate that VCRS process 20 is currently recording a perspective of the call for Natalie, the Honey Badgers, and Jane.

Figure 4:
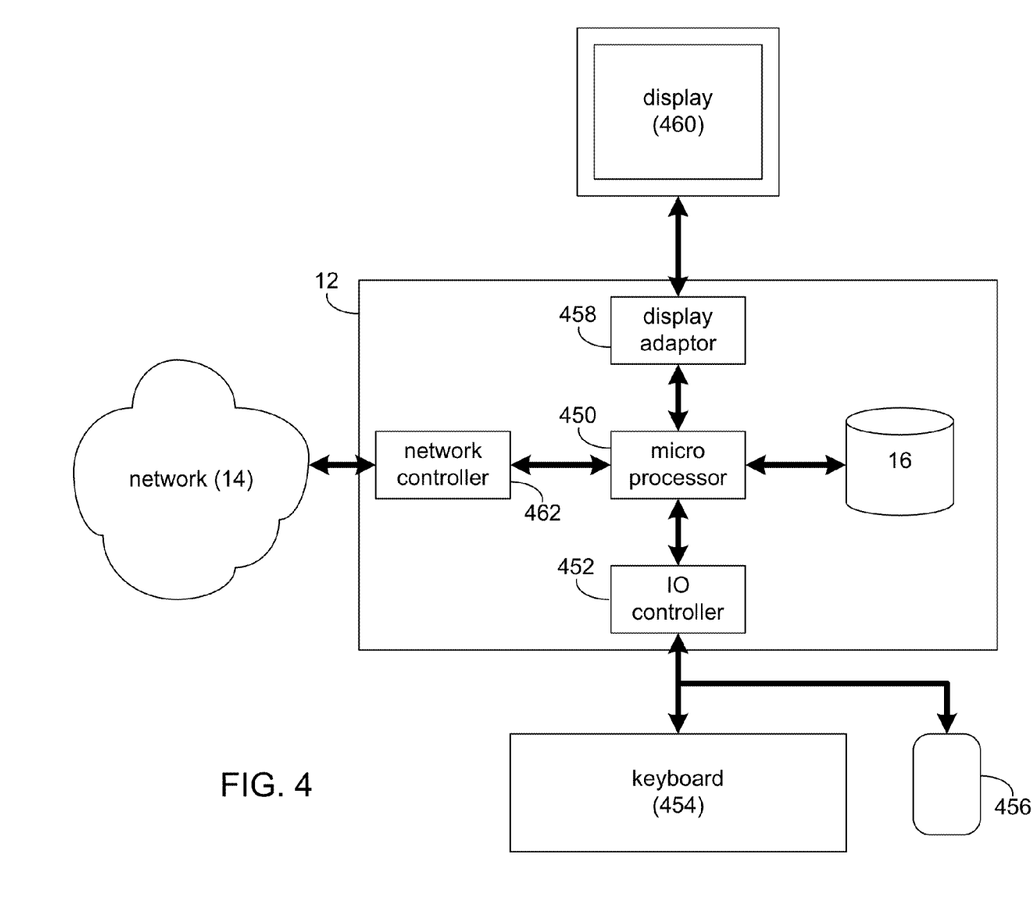
FIG. 4 is a diagrammatic view of a computing system that may execute or be utilized by the gaming group process of FIG. 1.

Referring also to FIG. 4, there is shown a diagrammatic view of an example computing system included in server computer 12. While computing system 12 is shown in this figure, this is for illustrative purposes only and is not intended to be a limitation of this disclosure, as other configuration are possible. For example, any computing device capable of executing, in whole or in part, a VCRS process (e.g., VCRS process 10, 20, 22, 24, or 26) may be substituted for the computing system 12 within FIG. 4, examples of which may include but are not limited to client electronic devices 28, 30, 32, 34.

Computing system 12 may include microprocessor 450 configured to e.g., process data and execute instructions/code for group profile process 10. Microprocessor 450 may be coupled to storage device 16. As discussed above, examples of storage device 16 may include but are not limited to: a hard disk drive; a tape drive; an optical drive; a RAID device; an NAS device, a Storage Area Network, a random access memory (RAM); a read-only memory (ROM); and all forms of flash memory storage devices. JO controller 452 may be configured to couple microprocessor 450 with various devices, such as keyboard 454, mouse 456, USB ports (not shown), and printer ports (not shown). Display adaptor 458 may be configured to couple display 460 (e.g., a CRT or LCD monitor and/or a touch-screen device) with microprocessor 450, while network adapter 462 (e.g., an Ethernet adapter) may be configured to couple microprocessor 450 to network 14 (e.g., the Internet or a local area network).

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of embodiments and implementations have been described. Nevertheless, it will be understood that various modifications may be made. Accordingly, other embodiments and implementations are within the scope of the following claims.

What is claimed is:

1. A computer-implemented method comprising:
   receiving, by one or more computing devices, an indication of an intent of a first participant in a multi-party video-enabled call to record a portion of the call;
   providing, by the one or more computing devices, a notification of the indicated intent to one or more other participants in the call, based upon, at least in part, receiving the indication;
   recording, by the one or more computing devices, a perspective of the call associated with the first participant; and
   automatically sharing with one or more other participants, by the one or more computing devices, the recording of the perspective of the call associated with the first participant.

2. A computer-implemented method comprising:
   receiving, by one or more computing devices, an indication of an intent of a first participant in a multi-party video-enabled call to record a portion of the call;
   providing, by the one or more computing devices, a notification of the indicated intent to one or more other participants in the call, based upon, at least in part, receiving the indication; and
   recording, by the one or more computing devices, a perspective of the call associated with the first participant.

3. The computer-implemented method of claim 2 further comprising:
   providing, to the one or more other participants in the call, a notification that the call is being recorded.

4. The computer-implemented method of claim 3 wherein the notification includes a persistent indicator associated with a representation of the first participant.

5. The computer-implemented method of claim 2 further comprising:
   sharing, with the one or more other participants in the call, the recording of the perspective of the call associated with the first participant.

6. The computer-implemented method of claim 2 further comprising:
   associating an annotation with a portion of the recording.

7. The computer-implemented method of claim 6 wherein associating the annotation is based upon, at least in part, a viewing pattern associated with the recording.

8. The computer-implemented method of claim 2 wherein the recording includes one or more augmentations associated with the call.

9. The computer-implemented method of claim 2 wherein the recording includes an image file representing a view of the call.

10. The computer-implemented method of claim 2 wherein the recording includes a video file representing a portion of the call.

11. A computer system comprising:
    one or more processor devices; and
    one or more memory architectures coupled with the one or more processor devices;
    wherein the one or more processor devices are configured to:
       receive an indication of an intent of a first participant in a multiparty video-enabled call to record a portion of the call;
       provide a notification of the indicated intent to one or more other participants in the call, based upon, at least in part, receiving the indication; and
       record a perspective of the call associated with the first participant.

12. The computer program product of claim 11 wherein the one or more processor devices are further configured to:
    provide, to the one or more other participants in the call, a notification that the call is being recorded.

13. The computer program product of claim 12 wherein the notification includes a persistent indicator associated with a representation of the first participant.

14. The computer program product of claim 11 wherein the one or more processor devices are further configured to:
    share, with the one or more other participants in the call, the recording of the perspective of the call associated with the first participant.

15. The computer program product of claim 11 wherein the one or more processor devices are further configured to:
    associate an annotation with a portion of the recording.

16. The computer program product of claim 15 wherein associating the annotation is based upon, at least in part, a viewing pattern associated with the recording.

17. The computer program product of claim 11 wherein the recording includes one or more augmentations associated with the call.

18. The computer program product of claim 11 wherein the recording includes an image file representing a view of the call.

19. The computer program product of claim 11 wherein the recording includes a video file representing a portion of the call.

* * * * *